United States Patent [19]

Caro

[11] Patent Number: 4,949,248
[45] Date of Patent: Aug. 14, 1990

[54] SYSTEM FOR SHARED REMOTE ACCESS OF MULTIPLE APPLICATION PROGRAMS EXECUTING IN ONE OR MORE COMPUTERS

[76] Inventor: Marshall A. Caro, 43 Little Neck Rd., Southampton, N.Y. 11968-4311

[21] Appl. No.: 220,024

[22] Filed: Jul. 15, 1988

[51] Int. Cl.$^5$ .................... G06F 13/00; G06F 13/14; G06F 13/38; G06F 13/42
[52] U.S. Cl. ................... 364/200; 364/242 J; 364/242 H; 364/242 K; 364/228.3; 364/228.4; 364/227.2; 364/400; 364/401; 364/408
[58] Field of Search ... 364/200 MS File, 900 MS File, 364/401, 408

[56] References Cited

U.S. PATENT DOCUMENTS

| | | | |
|---|---|---|---|
| 3,248,705 | 4/1966 | Damann et al. | 364/900 |
| 3,323,119 | 5/1967 | Barcomb et al. | 340/717 |
| 3,573,747 | 4/1971 | Adams | 364/200 |
| 3,623,067 | 11/1971 | Deal, Jr. et al. | 340/557 |
| 4,419,661 | 12/1983 | Hetsugi | 340/707 |
| 4,430,639 | 2/1984 | Bennett et al. | 340/310 |
| 4,441,162 | 4/1984 | Lillie | 364/900 |
| 4,456,951 | 6/1984 | Henneberger et al. | 364/200 |
| 4,486,853 | 12/1984 | Parsons | 364/900 |
| 4,513,373 | 4/1985 | Sheets | 364/200 |
| 4,535,401 | 8/1985 | Penn | 364/132 |
| 4,538,993 | 9/1985 | Krumholz | 434/118 |
| 4,604,686 | 8/1986 | Reiter et al. | 364/200 |
| 4,688,170 | 8/1987 | Waite et al. | 364/200 |
| 4,720,784 | 1/1988 | Radhakrishnan et al. | 364/200 |
| 4,774,664 | 9/1988 | Campbell et al. | 364/408 |

Primary Examiner—Archie E. Williams, Jr.
Assistant Examiner—Emily Y. Chan
Attorney, Agent, or Firm—Brumbaugh, Graves, Donohue & Raymond

[57] ABSTRACT

A local-area-network based system for shared remote access or control of application programs in one or more computers by one or more other computers is provided having particular utility for trading rooms of securities firms, wherein each operator position is permitted the capability to access any of a number of information services. Information services, each of which communicates with a personal-computer-based video source running an applications program specific to that information service, are represented on a local-area network as nodes called servers. Each server runs the application program, unmodified, together with other terminate-and-stay-resident software which periodically broadcasts a video message, the content of which is the change of the application program display screen contents since the time of the last broadcast. The sender of the broadcast does not watch for the acknowledgements from recipients, which are other nodes on the network called clients, nor does the sender maintain a list of intended recipients. If a recipient misses a video message broadcast, it may request that the sender broadcast the contents of the entire display screen contents. Each client runs terminate-and-stay resident software which may through a hot key sequence entered from the client's keyboard request control of the application program of a particular server. Upon being granted such control, which may be shared among two or more clients, the client may send keystrokes to the server for controlling its application program.

15 Claims, 2 Drawing Sheets

SYSTEM FOR SHARED REMOTE ACCESS OF MULTIPLE APPLICATION PROGRAMS EXECUTING IN ONE OR MORE COMPUTERS

SPECIFICATION

A microfiche appendix containing 185 frames on 2 cards is included in the specification and is hereinafter referred to as Appendix I.

BACKGROUND OF THE INVENTION

The present invention relates generally to the access and control of programs executing in one or more computers by remote terminals or computers, and more particularly to shared access and control of such programs by the remote terminals or computers.

In many computer user environments, such as a securities firm trading floor, it is necessary to provide at each operator location facilities to access information from or communicate with a number of separate information services (e.g. Quotron, Nasdaq, Reuters, Telerate). Formerly, it was necessary to provide at each operator location a separate data communications device for each information service to be accessed by the operator. Each data communications device, which may be a hardwired terminal or an appropriately programmed computer, has a keyboard, a display and control logic for controlling the functions of the device, including causing data received from the information service to be presented on the display and, if necessary, providing data entered at the keyboard to the information service. In this manner, the control logic of each data communications device serves as a video source for the information service with which the device is associated.

However, providing a separate data communications device at each operator location for each information service to be accessed by the operator has the problem in that the many such devices that are required occupy an excessively large amount of space at each operator location, and a separate set of communication lines from the information services to be accessed by the operators must be routed to each operator location.

A known solution to the foregoing problems is to use a video switching system to reduce the number of communication lines that are required from the information services and to reduce the number of video sources that are required to provide each operator with access to the information services.

A simplified illustrative example of a video switching system is shown in FIG. 1. Referring to FIG. 1, five operator locations 101-105 are each provided with a keyboard 106 and two display devices 107-108 to permit each operator to access as many as two of the three information services 109-111. The three information services 109-111 are respectively connected through communications lines 112-114 to three computers 115-117, which serve as the video sources for the information services. The video outputs 118-120 of the three video sources 115-117, respectively, are selectively connected to the displays 107-108 of each operator station 101-105 through a 3-by-10 switching matrix 121. Typically, each of the video outputs 118-120 of the video sources 115-117 provides a respective RS-170 video signal. The switching matrix 121 is controlled by a request handler computer 122, which receives input from each of the keyboards 106 at the operator stations 101-105. An operator may use the keyboard at his or her location to invoke a "dialog" mode with the request handler computer 122 in which the operator may use the keyboard to request the connection of a particular video source to one of the displays at his or her location. The operator may also use the keyboard to invoke a "passthrough" mode with the request handler computer 122 in which the operator's keyboard entries are provided to a particular video source for the purpose of either controlling the video source or providing data to the information service to which the particular video source is connected. The operator may use the keyboard at his or her operator location to invoke the passthrough mode of operation with the request handler computer 122 to allow keystrokes from that keyboard to be provided to any one of the video sources 115-117.

The passing of keystrokes from the keyboards 106 at the operator locations 101-105 to the video sources 115-117 by the request handler computer 122 operating in the passthrough mode is implemented through a bus 123 of the request handler computer 122 to which the video sources 115-117 are coupled through respective keyboard adapters 124-126. Each keyboard adapter, which is connected between the bus 123 and the keyboard input of the associated video source, serves to emulate the keyboard which is normally used with the computer serving as the video source in the illustrative example. Thus, each of the video sources 115-117 may be accessed and controlled from any of the remote operator locations 101-105 through the request handler computer 122 without any modification of the hardware or programs of the computer being used as the video source, other than the removal of its keyboard and display which are not used. Therefore, the access and control of the video sources 115-117 from the operator locations 101-105 are said to be "transparent" to the video source, since each video source receives keyboard inputs indistinguishable from those it would have received from its own keyboard if one were provided, and each video source provides a video output which is the same video output it would have provided to its own display if one were furnished.

Where the video source is a programmed computer, remote access and control of the video sources by means of the video switching system is accomplished without altering the program which is normally executed in the computer.

Since a given video source can process input from only one of the operator location keyboards at a time, the program of the request handler computer 122 provides for the arbitration among the operator locations seeking to provide input to any given video source at the same time. Normally the system is designed so that to a given operator entering input from the keyboard at his or her operator location, access to a given video source would appear to be contemporaneous with access to the same video source by one or more other operators at their respective operator locations.

The video switching system, of which a simplified illustrative example is shown in FIG. 1, provides for the remote access and control of multiple video sources to be shared by an arbitrary number of operator locations of the system. The access to and control of a particular video source through the video switching system can be limited exclusively for a time to a single operator location or can be shared among many operator locations contemporaneously. In addition, the video switching system permits some operator locations to view the video presentation provided by a shared video source and other operator locations to view the video presentations and control the shared video source in the manner described above.

Although the video switching system provides the advantages of reducing the amount of equipment required at each operator location and the number of communications lines which must be routed to each operator location, when compared to providing a separate video source for each information service to be accessed at each operator location, the video switching system has a number of significant drawbacks which makes it disadvantageous for modern computer user environments.

A video switching system is inherently costly because of the extensive overhead equipment, such as the switching matrix 121 and the request handler computer 122, which must be installed and continually maintained. Further, there is a substantial wiring cost associated with the installation of a video switching system in that each display at each operator location must be connected by a separate line to a central switching matrix. As system size grows, the video switching matrix must be expanded quadratically with system size. For example, if the number of operator positions and video sources are doubled, the size of the switching matrix quadrupled.

In addition, the video switching systems, which typically use 75-ohm coaxial cables to carry the video signal from a video source to the displays at the operator locations through the switching matrix, do not provide sufficient video bandwidth required by modern, high-resolution color computer displays. Consequently, such modern displays cannot be used in a video switching system without significant degradation in the quality of the video presentation at the operator locations. This latter drawback is becoming increasingly serious with the rising popularity of personal computers with modern, high-resolution displays as the video source specified or supplied by the information service providers. Moreover, the video switching system, which has a large number of hardware components, is subject to a relatively high rate of failures and is difficult to service and maintain.

Local area networks (LANs) are known and are used to provide distributed processing environments in which multiple computers attached to the LAN can share resources, such as printers and disk drives, and exchange and share data among computers which are part of the LAN or computers which are external to the LAN but connected to the LAN through gateway devices. Recently computers with large-screen displays or multiple-screen displays have been developed to be attached to LANs. Such computers have the capability of providing simultaneous multiple screen displays.

A computer on a LAN can access data in another computer on the LAN through its keyboard, provided that the accessing computer and the computer being accessed are each executing special programs designed for the purpose of enabling such access. Owing to the need for such special programs and the limited modes of data access provided thereby, the display of the accessing computer cannot present the screen presentation of another computer executing an arbitrary application program. As such, "transparent" access by one computer on a LAN to an arbitrary application program executing in another computer on the LAN is not available.

Similarly, given the need for such special programs, the accessing computer cannot control through its keyboard an arbitrary application program executing in another computer on the LAN. Accordingly, "transparent" control of one computer on the LAN by another computer on the LAN is not available.

Furthermore, shared access and control, where two or more computers on a LAN each display the screen presentation of another computer on the LAN or where two or more computers on a LAN each control through their respective keyboards and displays an application program being executed in another computer on the LAN are also not available.

A program called "NETmanager" is available from Brightwork Software which is used to allow a "help desk" computer on a LAN to access the screen and control the keyboard of another computer on a LAN where the operator of the other computer is experiencing hardware or software problems, provided that the application program of other computer is of a limited class. Using the NETmanager program, a technician operating the "help desk" computer can assist the operator of the other computer in diagnosing and solving his or her problems. The NETmanager software does not provide for either shared access or shared control of an arbitrary application program in a computer on a LAN by other computers on the LAN.

Accordingly, a need clearly exists for a system which provides for the remote shared access and shared control of one or more application programs in respective computers, hereinafter referred to as "server" computers, by a plurality of other computers, hereinafter referred to as "client" computers, and which avoids the above-described problems associated with the video switching system. Further, it is desirable to have such shared remote access and control be transparent to both the server computers and the client computers in that each server and each client can execute an arbitrary, unmodified application program while still having the capability of performing the shared access and shared control functions. Moreover, it is desirable to implement such a system for shared remote access and control using a LAN which has sufficient bandwidth to accommodate the modern display devices used in personal computers, as well as other features which are particularly suited for use with personal computers.

It would also be highly desirable to provide a LAN-based system for shared remote access and control of application programs in computers which can accommodate a wide variety of disparate computers.

SUMMARY OF THE INVENTION

The problems and drawbacks of the prior art, as described above, are substantially overcome with the present invention, which is a system for remote shared access or control of one or more application programs executing in one or more server computers on a LAN by one or more client computers on the LAN. Each of the server computers has at least a screen memory or equivalent containing video data representing a screen presentation, a program memory containing at least one application program, a respective operating system program and a respective local area network driver program, a processor for executing the programs in the program memory, and a respective interface to the local area network. Each of the client computers has at least a screen memory containing the video data representing a screen presentation, a display for presenting the video data in its screen memory, a keyboard, a program memory containing at least a respective operating system program and a respective local area network driver program, a processor for executing the programs in the program memory, and a respective interface to the local area network.

Each of the server and client computers is provided with a respective program for shared access and control. These programs provide the server and client computers with the following functions through the use of sequenced packet protocol communication over the LAN:

Each server computer responds to a change in the video data in its screen memory or equivalent for providing on the local area network one or more videograms representing the change in the video data. Each client responds to a predetermined hot-key sequence entered from its keyboard for providing on the local area network a control request message requesting control of an application program of one of the server computers identified by the hot-key sequence. A server computer responds to a control request message on the local area network requesting control of a particular application program of that server computer by first confirming whether or not the client computer providing the control request message is permitted to control the application program and then providing on the local area network a control request reply message respectively granting or denying that client computer control of the application program of that server computer. A client computer responds to a control request reply message granting it control of an application program of a particular one of the server computers by providing on the LAN a video recovery request message requesting one or more videograms representing all the video data in the screen memory or equivalent of the particular one of the server computers and processing each videogram on the local area network provided by the particular one of the server computers by changing the video data in its screen memory in accordance with the videogram. A client computer responds to a control request reply message on the LAN granting it control of an application program of a particular one of the server computers, for which the client computer has provided a control request message, and to one or more keystrokes from the keyboard of that client computer for providing on the LAN one or more keystrokegrams representing the one or more keystrokes. A server computer responds to a video recovery request message on the LAN from a client computer to which that server has granted control of its application program by providing over the LAN one or more videograms representing all the video data in the screen memory of that server computer. A server computer responds to one or more keystrokegrams on the LAN from a client computer to which that server computer has granted control of its application program by deriving the one or more keystrokes represented by such keystrokegrams, and passing the derived keystrokes for processing by the application program of the server computer.

In addition, a client computer responds to a different predefined hot key sequence from its keyboard for providing on the LAN a video request message requesting access to the video data in the screen memory or equivalent of one of the server computers identified by the hot-key sequence. A server computer responds to a video request message on the LAN by confirming whether or not the client computer providing the video request message is permitted to access the video data in its screen memory or equivalent and providing on the LAN a video request reply message respectively granting or denying the client computer providing the video request message access to the video data in the screen memory or equivalent of that server computer. If the client computer providing the video request message is granted such access, the server computer granting such access provides on the LAN one or more videograms representing all the video data in its screen memory or equivalent. A client computer responds to a video request reply message granting it access to the video data in the screen memory or equivalent of a particular one of the server computers, for which the client computer has provided a video request message, by processing each videogram on the LAN provided by that server computer and changing the video data in the screen memory of the client computer in accordance with the videogram.

Furthermore, a server computer passes the keystrokes derived from the keystrokegrams provided by each client computer to which that server computer has granted control of an application program of that server computer in accordance with a predetermined priority scheme. If the server computer has its own keyboard, the keystrokes entered from the server computer's own keyboard are assigned a lower priority than the keystrokes derived by the server computer from keystrokegrams on the LAN.

Each videogram provided by a server computer includes a sequence number indicative of the order in which the videogram is provided on the LAN by that server computer. Further, each control request reply and video request reply provided by the server computer granting a client computer control of an application program in the server computer and access to the video data in the screen memory or equivalent of the server computer, respectively, includes the sequence number of the next videogram to be provided on the LAN by that server computer. A client computer determines whether the sequence number of a current videogram on the LAN provided by a server computer which has granted that client computer control of an application program of that server computer or which has granted that client computer access to the video data in the screen memory or equivalent of that server computer is greater by one than the sequence number of the previous videogram provided by such server computer and processed by the client computer. If the sequence number of the current videogram is not greater by one than the sequence number of the previous videogram, the client computer provides a video refresh request to that server computer.

The program provided in each of the server computers for shared access and control in accordance with the present invention may be separate from the respective unmodified application programs in the server computers to provide for transparent shared access and control of the respective unmodified application programs in the server computers. Alternatively, the programs provided in the server computers for shared access and control in accordance with the present invention may be part of modified application programs in the server computers.

Furthermore, there may be provided on the LAN one or more cooperating server computers, each capable of concurrently executing a plurality of application programs each including program routines for shared access and control in the manner described above. Such cooperating server computers may each emulate a plurality of server computers on the LAN.

Finally, there may also be provided on the LAN one or more cooperating client computers, each capable of executing of plurality of application programs each having program routines for shared access and control in the manner described above. Such cooperating client computers may each emulate a plurality of client computers on the LAN.

BRIEF DESCRIPTION OF THE DRAWINGS

An exemplary embodiment of a system for remote shared access and control of one or more application programs executing in one or more server computers by one or more client computers, in accordance with the invention is described with reference to the accompanying drawing, in which.

For convenience of reference, like components, structural elements and features in the various figures are designated by the same reference numerals or characters.

DETAILED DESCRIPTION OF THE INVENTION

Figure 1:
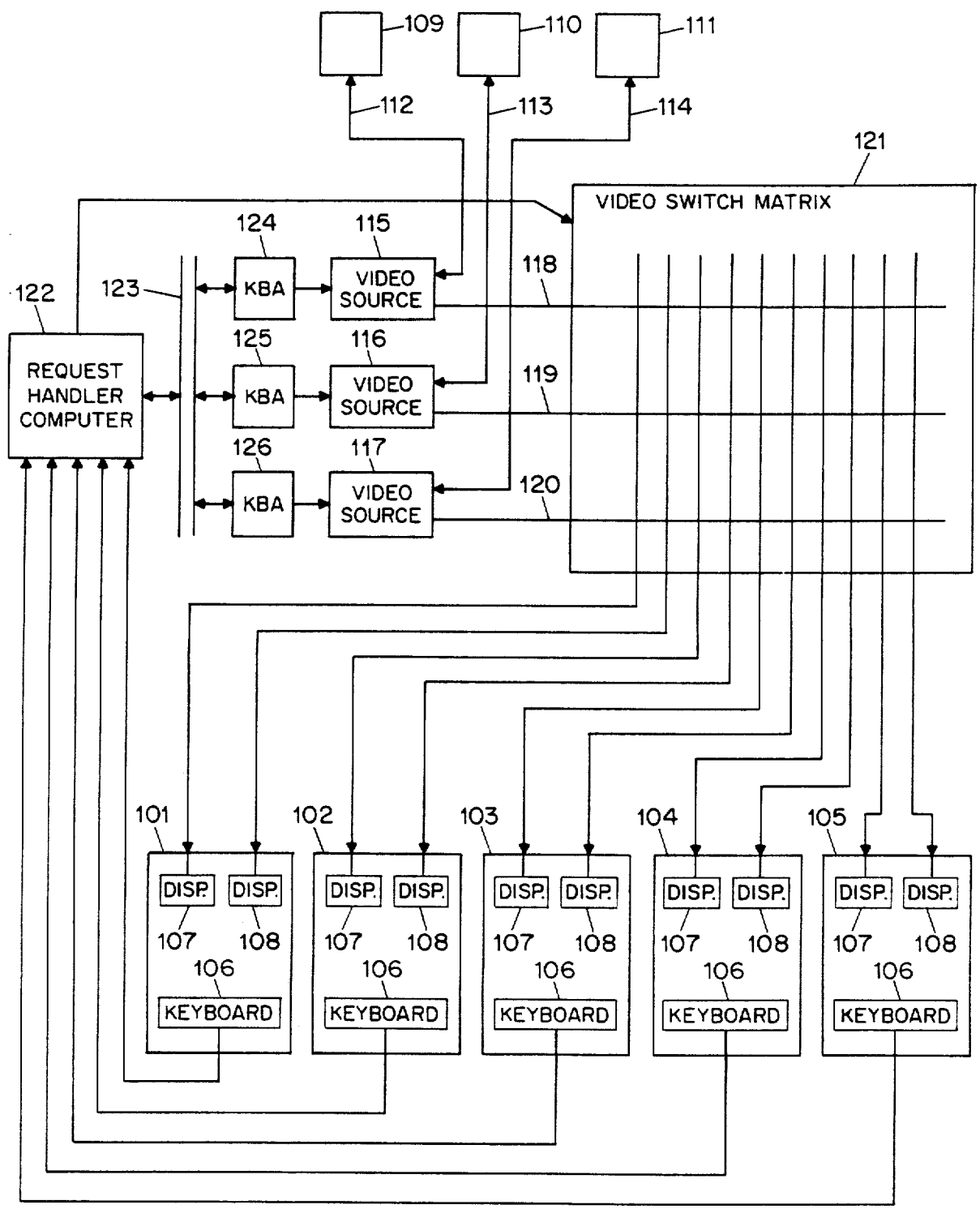
FIG. 1 is a block diagram of a simplified illustrative example of a video switching system for shared remote access of video sources.
Figure 2:
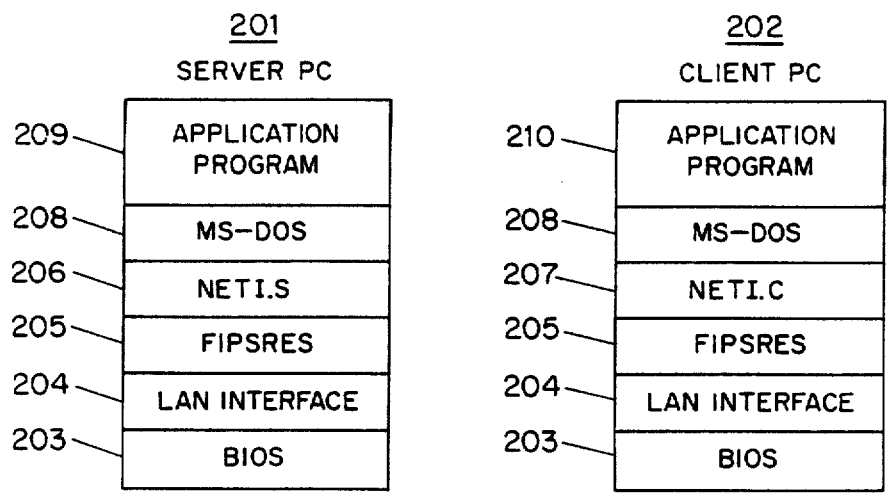
FIG. 2 are memory maps respectively showing the programs in the program memories of a server and a client according to the exemplary embodiment of the invention.

FIG. 2 depicts memory maps 201 and 202 of the server computer and the client computer, respectively, which in accordance with the exemplary embodiment of the invention are IBM compatible personal computers. As shown by memory map 201 the program memory of a server computer contains the IBM compatible personal computer BIOS 203, appropriate LAN interface software 204, a program called FIPSRES 205, a program called NETL_S 206, the MS-DOS operating system 208, and an applications program 209. As shown by memory map 202, the program memory of a client computer contains the IBM compatible personal computer BIOS 203, appropriate LAN interface software 204, the FIPSRES program 205, a program called NETL_C 207, the MS-DOS operating system 208, and an optional application program 210.

The BIOS 203 performs the basic input/output functions for the IBM compatible personal computers used as the server and client computers of the exemplary embodiment. The LAN interface software 204 allows the FIPSRES program 205 to send and receive messages on the LAN according to a well-known interface standard called NETBIOS. The MS-DOS 208 provides operating system functions for the IBM compatible personal computers used as the server and client computers of this exemplary embodiment. The programs FIPSRES 205, NETL_C 207 and NETL_S 206, which are discussed further below, provide the shared remote access or control capabilities in accordance with the invention. The application program 209 represents an arbitrary program of a server computer, for which shared remote access or control is provided in accordance with the invention. Because the FIPSRES, NETL_C and NETL_S programs are not part of and execute independently of the application programs 209 and 210 of the server and the client, respectively, the client and server computers whose memory maps are shown in FIG. 2 are said to be "transparent".

Figure 3:
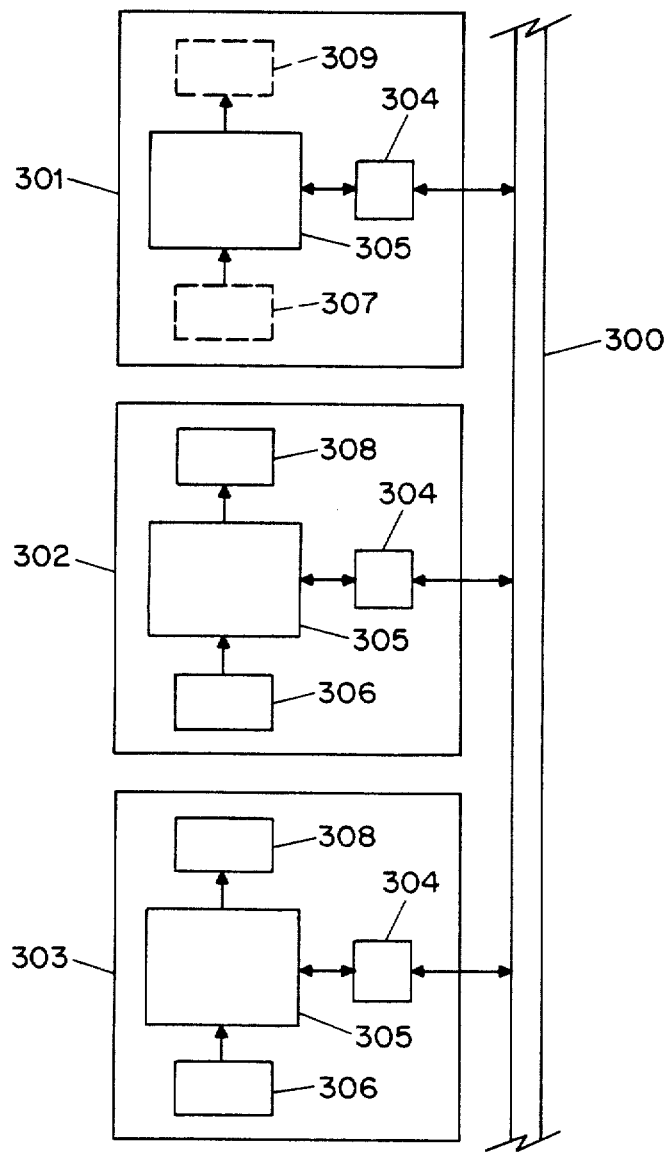
FIG. 3 is a functional block diagram showing two client computers and one server computer on a local area network for shared remote access and control according to the exemplary embodiment of the invention.

FIG. 3 shows an exemplary system for remote access and control in accordance with the invention, which for simplicity of the illustration, includes a local area network 300, one transparent server 301 and two transparent clients 302, 303. It is noted that the system of FIG. 3 may include additional client clients and servers.

Each client 302, 303 includes a LAN interface card 304, a CPU 305, a keyboard 306, and a display 308. The server 301 includes a LAN card interface 304 and a CPU 305, and may also include a keyboard 307 and a display 309, each shown in phantom in FIG. 3. In the exemplary embodiment of FIG. 3, the CPU 305, the keyboard 306, and the display 308 are all part of ordinary IBM compatible personal computers. The LAN 300 and the LAN cards 304 are conventional LAN cable and interface hardware, such as those of the Untermann-Bass NIUPC LAN system.

The clients 302, 303 each contain ordinary IBM compatible personal computer BIOS and MS-DOS software, as well as conventional LAN software provided with the LAN interface card 304. The clients 302, 303 also each contain a program FIPSRES and a program NETL_C, for which source code listings are included in Appendix I. When a client 302, 303 is powered up or rebooted, an AUTOEXEC file causes FIPSRES and NETL_C to be loaded from a diskette or hard disk drive of the computer into its main memory of the client, and causes the FIPSRES and NETL_C programs to become "terminate and stay resident" (TSR) programs in the client's program memory. The FIPSRES program is used to assemble a data packet, if requested to do so by the NETL_C program, and gives the data packet to the LAN software, which in turn causes the program, LAN interface card 304 to provide the data packet on the LAN. A data packet to be processed by the client 302 is received at its LAN interface card 304 under the control of the LAN interface software, initially processed by FIPSRES and then made available to NETL_C. Clients 302, 303 may each optionally have respective application programs.

Similarly, the program memory of the server 304 also contains the program FIPSRES and a program NETL_S, which in the present embodiment is identical to NETL_C. As in the case of the clients, FIPSRES and NET_C are TSRs in the program memory of the server. The FIPRES program is used to assemble a data packet, if requested to do so by NETL_S, and gives the data packet to the LAN interface software, which in turn causes the LAN interface card 304 to provide the data packet on the LAN. A data packet to be processed by the server 301 is received at LAN card 304 under the control of the LAN interface software, initially processed by FIPSRES, and made available to NETL_S, which in turn makes certain data in the received data packet available to the application program of the server. The application program for the server 301 may be a program which causes the server 301 to operate as a terminal for an associated information service.

When a server 301 is powered up or rebooted, an AUTOEXEC file causes FIPSRES and NETL_S to be loaded from a diskette or hard disk drive of the computer into its main memory and causes FIPSRES and NETI_S to become TSR programs in the program memory of the server 301.

When an operator using the client 302 wishes to access or control a particular server, he or she activates a "hot key" sequence. A hot key sequence is a predetermined combination of one or more keystrokes which invokes execution of a program not previously being executed, in this case, NETI_C. The hot key sequence activated by the operator also identifies a particular server to be accessed or controlled by the client being used by the operator.

When an operator wishes to control a server, such control requires keystrokes from the client to be sent to the server and video information from the server to be returned to the client. When an operation wishes to access a server, such access requires only video information from the server to be sent to the client for presentation on the display of the client.

Where the request is for control of a server, the FIPSRES and NETI_C programs prepare a "control request" packet bearing the address of the server and transmit it on the LAN. Each server receives the packet, and checks to determine if it is the server to which the packet was addressed. Servers which determine that the packet was not addressed to them take no further action regarding the packet, and only the server to which the packet was addressed processes the packet further.

When a client provides a packet bearing the address of a specific server, the client may be said to have sent the packet to that server, and this terminology will be used hereinbelow. However, it should be noted that each packet provided on the LAN by a server or client reaches all clients and servers on the LAN, regardless of the address of the packet.

If a control request packet bearing the address of server 301 was provided on the LAN by a client, then LAN card 304 of server 301 receives the request packet under the control of the LAN interface software, and data in the control request packet is processed by FIPSRES and NETI_S. NETI_S checks whether another client already has control of server 301, in which case the present control request will be denied. The denial is communicated to the requesting client by means of a so-called "closure" packet containing bytes indicating the denial of control. The denial, when received by the requesting client and processed by NETI_C, is communicated to the operator by means of a screen message. This denial of control by a server is analogous to the denial that is received by an operator station in a video switching system if the video source for which control is sought is not available for control by that operator station.

If the server has not already granted control to another client, it then checks its configuration file to determine whether the client requesting control of the server is one which is permitted to control that server. If not, a denial is sent to the requesting client in the manner described above. If the server configuration file so provides, the requesting client may preempt control of the server from another client which presently has control of the server. Alternatively, the server configuration file may provide that more than one client is permitted to have control of a server at a time.

If the necessary conditions for a requesting client to be granted control of a server, as described above, is satisfied, the server sends the requesting client a closure message containing bytes indicating that control has been granted. The client responds to such a closure message by sending the server a video refresh request packet requesting that the data corresponding to the entire current screen presentation of that server be sent to the client. The server in response to such a video refresh request packet sends the client one or more "videogram" packets containing data corresponding to the entire current screen presentation of the server. Each videogram packet provided by a server on the LAN includes a modulo 256 videogram sequence number, which will be discussed further below. The client receiving such videograms, known as a "full-screen refresh", presents the data corresponding to the entire current screen presentation of the server on the client's own display. This may be compared with the conditions in a video switching system at the moment when the video switching matrix has made a connection between a particular video source and a display at an operator location.

An IBM compatible personal computer such as the ones used as the server 301 and the clients 302 and 303 has a video memory or equivalent which contains video data corresponding to the current screen presentation on the display of the computer, if that computer were provided with a display. The contents of the video memory or equivalent are available to an application program running in the computer. The applications program executing in the server 301 may be one which causes the server 301 to function as a video source associated with an information service.

An applications program being executed in an IBM compatible personal computer receives its keyboard input from a keyboard buffer established by MS-DOS and BIOS. It is known that TSR programs, such as FIPSRES and NETI_C or NETI_S, may be resident in the program memory of the computer, and that such programs are arranged so that in response to any of certain interrupt signals, the CPU will execute the TSR programs, and when execution of the TSR programs has finished, control will return to the application program.

About eighteen times per second, the server application program is interrupted, and a routine called NETI_VID of the NETI_S program is executed. NETI_VID compares the present contents of the video memory of the server with a copy of the previous contents of the video memory of the server created the last time NETI_VID was executed. If there have been no changes in the context of the video memory of the server, NETI_VID terminates and control returns to the applications program. If changes in the contents of the video memory of server are detected, the NETI_VID routine prepares one or more videogram packets containing data representations of such changes, and the server provides such videogram packets on the LAN. As mentioned above, each videogram packet provided on the LAN by a server bears a module 256 sequence number indicative of the order in which the videogram was provided by that server on the LAN.

After a client has received the full-screen refresh from a particular server in response to a video recovery request, the subsequent videograms sent by the server to the client are used to update the screen presentation of the client. The program NETI_C in the client responds to each videogram packet sent by the server and processes such videogram packets to update the client's display. As a result, the client's display presents the current screen presentation of the server as represented by the contents of the video memory or equivalent of the server.

Each server is provided videograms on the LAN on a continuous basis, regardless of whether any client has requested control of or access to the server. A particular client which is receiving and processing the videogram packets sent by a particular server to provide the current screen presentation of the server on the client's display must receive each such videogram packet in its proper order. If the sequence number of the videogram packet currently being received is not greater by one than that of the last videogram packet received from the server and processed by the client, the out-of-sequence videogram is not processed by the client, which sends the server a request for a full screen refresh. Because few videogram packets are ever lost, such requests for a full-screen refresh are rarely required.

As mentioned above, each videogram provided on the LAN by a server includes a modulo 256 sequence number. Further each closure packet sent by a server granting a requesting client either control or access of the server includes the sequence number of the next videogram message to be provided on the LAN by that server.

The full-screen refresh, together with the videograms, provides real-time video information to the client, just as in the video switching system the video switching matrix and dedicated coaxial cables provide it to the operator location.

A server executing certain application programs may provide videogram packets on the LAN on an infrequent basis because such application programs rarely causes the screen presentation of the server to change. Under such circumstances, the failure of a client to receive a single videogram packet would not be known until the arrival of the succeeding videogram packet and the detection by the client of an incorrect sequence number for the succeeding videogram packet.

To minimize the period of time during which a client fails to detect loss of a videogram packet, the system of the exemplary embodiment of the invention provides "heartbeat" messages. Periodically each server sends a heartbeat message containing the current videogram packet sequence number. A client may compare the heartbeat sequence number with that of the last videogram packet received from the server by that client. If the heartbeat sequence number fails to correspond with that of the last videogram packet, the client requests a video refresh from the server.

The operator of the client computer having control of a server may wish to make a keyboard entry, either to control the application program executing the server or, in the case where the application program is in communication with an information source, to direct the application program to take certain action regarding the information source. If the operator presses a key on the keyboard of the client computer, the keystroke is processed by NETI_C in the program memory of the client computer. The NETI_C program prepares a "keystrokegram" packet containing the keystroke, and sends the keystrokegram to the server via the client's LAN card 304 and the LAN 300. The server receives the keystrokegram packet by means of its LAN card 304, and execution of the server application program is interrupted for the execution of NETI_KEY routine of the NETI_S program. NETI_KEY processes the keystrokegram packet to derive the keystroke and places the keystroke in the keyboard character queue of CPU 305 of the server computer 301. Thereafter, execution of the NETI_KEY routine terminates, and execution of the applications program resumes, with the derived keystroke in the keyboard character queue being processed in the same manner as a keystroke originating from the keyboard 307 of the server 301.

From the point of view of the operator of the client computer, it is as if the applications program executing in the server were executing in the CPU 305 of the client computer. Keystrokes entered at the keyboard of the client give rise to the appropriate changes in the screen presentation on the display of the client, with little, if any perceptible delay. The applications program of the server is thus controlled by the operator of the client computer.

When an operator wishes to access a server for viewing its screen presentation on the display of a client, the operator enters a hot key sequence from the keyboard of the client corresponding to the access of a particular server. The FIPSRES and NETI_C programs of the client process the hot key sequence and prepare an access request packet which is sent to the particular server via its LAN card 304 and the LAN 300. A server, upon receiving an access request packet sent to it, determines whether the client requesting access has permission to do so. If the client requesting access does not have permission, the server sends a closure packet to that client denying it access. If the server determines that the client requesting access has permission for such access, the server sends the client one or more videogram packets for a full-screen refresh of the display of the client with the current screen presentation of the server. Thereafter, the client which has been granted access to the server receives and processes successive videogram packets provided by the server to permit the operator of the client to view the screen presentations of the server on the display of the client. It is noted that the configuration file of the server may be such that any number of clients may simultaneously access the server to view its screen presentations on the displays of the accessing clients.

It will also be noted that the applications program need not be modified to function in the server computer 301. The applications program in the server processes keystrokes entered from the keyboard of the client, just as it would process keystrokes entered from its own keyboard. The application program also provides screen presentations to the display of the client, just as it would provide screen presentations to its own display. Thus, the system of the exemplary embodiment provides transparent shared access and control of the applications program executing in the server.

NETI_C and NETI_S communicate with the local area network through the network driver program FIPSRES. A source code listing of FIPSRES is included in Appendix I. Although the exemplary embodiment of the present invention makes NETI_C and NETI_S separate from FIPSRES, it is not necessary to do so. The function of the network driver FIPSRES is to assure reliable transport of data to and from all clients and servers on the LAN.

The system in accordance with the present invention provides the advantage of contemporaneous sharing of access to or control of remote computing resources. This advantage is largely achieved by the timeliness of the interactions and the accuracy and reliability of the communications. It has been found that broadcast transmissions best accomplish the sharing of information with multiple points on the network. Point-to-point transmissions, in which there is individual messaging and acknowledgement between each sender and each of its recipients, take too long. The inherent problem here is that all commercially available networks provide session services which automatically provide reliable point-to-point data delivery, but none of them provides a fast and reliable broadcast delivery system.

The server 301 and the clients 302 and 303 on the LAN 300 exchange data in packets. A packet is the smallest LAN transmission unit used by the system. Packets contain certain data and supervisory information, and are fixed in length. Some packet types use less than the entire length of the packet for information. Packets consist of a preamble, a data segment, and a postamble. Only the preamble and data segment are transmitted. The postamble is used locally for administrative and debugging functions.

The packet preamble consists of ten bytes: a message type byte, a message ID, a packet sequence number serving as the ID of the packet within a multipacketed message, the ID of the information service (e.g., Reuters), the last sequence number within the message, a NET BIOS number, and a page number type.

The message type may be any of the following: closure, request, heartbeat, keystrokegram, or videogram.

A videogram consists of video commands which are concatenated in the data field of the packet. Each command is succeeded by another command until the end of the packet is reached or a last command is indicated. The default data definitions for the cursor, mode, attribute and data fields are described in the IBM PC/AT Technical References BIOS INT 10 Calls. The video commands in Assembler format are as follows:

tain unique message counters, and all message counters are incremented by one each time a message is sent.

The above-described protocol is advantageously fast and efficient because it does not rely on positive acknowledgements to assure message delivery. In the event a videogram is lost or corrupted, the remedy is that the screen of a client is refreshed in its entirety. In this way, the whole of the retransmission problem in multipoint distribution is eliminated. The sender does not have to keep a list of his intended recipients, and there is no need to retain a copy of the videogram for retransmission.

The underlying assumption being made is that errors in sending videograms will be sufficiently few and far between to make the retransmitting of entire screens extremely rare events.

As mentioned above, FIPSRES is a TSR driver. When the computer is started or rebooted, this is the setup and startup program for the system. It reads a file which contains the working environments for all programs that need to use the protocol. FIPSRES creates the necessary table structures in low memory of the computer, establishes the interrupt service routines and pointers to the data structures, and then exits resident, using only enough space for the service routines and tables.

NETI_S performs the following functions at startup time. It reads a configuration file defining characteristics of the server. NETI_S sets up registers to intercept and process the hardware interrupts 08 (system clock) and the system BIOS software interrupt 16 (Read Keystrokes/Status), and optionally rotates the interrupt priorities so that the clock is made the lowest priority interrupt, instead of the highest.

NETI_S also determines if there is sufficient ex-

| | | |
|---|---|---|
| VCLASTORDER | EQU 00 | ;NO MORE ORDERS IN PKT |
| VCSETMODE | EQU 01 | ;SET MODE COMMAND −1 DATA BYTE |
| VCSETCURSOR | EQU 02 | ;SET CURSOR - ROW,COLUMN |
| VCSENDDATA | EQU 03 | ;CNT,ROW, COLUMN FOLLOWED BY ;DATA/ATT PAIRS |
| VCSENDCOMPRESSED | EQU 04 | ;CNT,ROW,COLUMN FOLLOWED BY ;DATA ATT PAIR |

The keystrokegram commands are concatenated in the DP_DATA field. Each command is succeeded by another command until the end of the packet reached or a last order is detected (HEX 00). The default data definitions for the shift states, scan codes, and ascii values are described in the IBM PC/AT Technical References Keyboard BIOS Sections INTA and INT. The keystrokegram commands in Assembler format are as follows:

panded memory to operate. If sufficient expanded memory is available, NETI_S will allocate expanded memory and move most of the resident code there.

NETI_S then exits, leaving a small resident program in place to perform the transparent server functions.

The routine NETI_VID is executed once for every clock tick, which is triggered in an IBM compatible personal computer by interrupt 08. NETI_VID determines if the video mode of the computer has been

| | | |
|---|---|---|
| KLASTORDER | EQU 00 | ;NO MORE ORDERS IN PKT |
| KSETSTATE | EQU 01 | ;SET SHIFT STATE (2 bytes) |
| KSENDSTROKE | EQU 02 | ;SCAN CODE/ASCII PAIR |
| KSENDMULTIPLE | EQU 03 | ;CNT, SCAN CODE/ASCII PAIRS |

The request and closure (i.e., replies) messages are used to arbitrate access to server computers by client computers.

Messages are composed of one or more packets. Each packet preamble in a message contains the message ID, the packet ID within the message, and the ID of the item to which the message refers. All data items main-changed by comparing the current BIOS data cell with the value saved from the last pass. If the video mode is different, the server will store the new value. Thereafter, the server allocates and formats a videogram packet and builds a VC_SET_MODE video command in the videogram packet. This communicates the change of mode to clients.

NETI_VID then compares the current contents of video memory with the values that were saved from the last pass. If there are any discrepancies the server program will:

A. Determine the length, in bytes of the area in video memory that has been modified (again, by comparison with the stored values from the last pass).

B. Copy the changed information from video memory to the storage area so that the storage area is accurately maintained and contains the same values as the video memory, and the server is prepared for the next pass.

C. Allocate and format a videogram packet, if none is currently in use.

D. Attempt to fit all of the change information into the videogram packet. If there is sufficient room in the packet, the server will build a VC_SEND_DATA or VC_SEND_COMPRESSED command. If there is not sufficient room left in the packet, the server will build as large a command as it can fit into the packet and then queue the packet for transmission on the LAN, then allocate and format a new packet. The actual transmission is performed by procedures in the network driver program, FIPSRES, described above. FIPSRES in turn invokes procedures provided by the LAN adapter. The packet and command structures were chosen so that video commands could be easily packed and split across multiple packets without incurring a great deal of extra overhead. The server calculates the new starting offset for the residual command and repeats the process, ending when the original command (or the derivation) is completely "packetized" into videograms.

The server then continues the comparison of the video memory with the contents from the last pass, at the offset following the end of the data referenced by the last change. This continues until the entire video memory space has been processed.

NETI_VID then compares the current cursor position (read from BIOS memory cells or the CRT controller, by the initialization option) with the values stored from the previous pass. If the value has changed, the server will store the new value. Thereafter, if no videogram packet is available the server will allocate and format a new one. If there is insufficient room in the current packet to build the command, the server will queue the current packet for transmission by the network drivers and allocate and format a new one. The server will generate a VC_SET_CURSOR command and place it into the current working packet. This communicates the cursor position, which is not in video memory, to clients.

If there is a current packet allocated and partially filled, as a result of the steps described above which are carried out when a difference exists between the present and the previous contents of the video memory, but not been queued for transmission, the server will queue it for transmission.

NETI_VID then determines if there are any packets that have been received from the network that are queued for processing and processes such packets.

The server is programmed to process two types of received packets, namely, request packets and keystrokegram packets.

There are two types of request packets, namely, video refresh requests and control (keyboard access) requests. Video refresh requests contain a request for either an initial transmission or a recovery transmission of the contents of the server's video memory. For both initial and recovery requests, the server will attempt to match the requestor's identifier (ID contained in the request message) with an entry in the server's list of bona fide accessors. If a match is found, the server will allocate a packet and format a closure packet which will contain a reply message.

The reply message for a video refresh request contains the current value of the server's message sequence number, which will permit the requestor to synchronize with the server. This sequence number is increased by one, modulo 256, each time the server formats a videogram packet. The server will then transmit the entire contents of video memory encoded into videogram packets which are compressed, if possible.

The other kind of request is the control (keyboard access) request, by which a client either requests permission to send keystrokegrams to the server, or voluntarily relinquishes control. The server will verify the requestor's ID and determine from the request and the current session state whether control (keyboard access) can be granted or denied. If the server's access type is session, the server may preempt an existing session holder (client) for the new requestor (client) if the requestor's priority is sufficiently high. The server arbitrates control (keystroke access) based on the access type defined in the configuration file. Access types currently employed are:

Unrestricted: The server accepts all keystrokegrams from eligible client computers.

Session: The server will accept keystrokegrams from the current session holder (client) only.

If access or release is granted, the session state is updated, if necessary, and the server will allocate a packet and format a closure packet which will contain a reply message.

The reply message for a control (keyboard access) request contains an acknowledgement of the transaction, and a flag which advises the client whether or not he can send keystrokegrams to the server.

The other type of packet is the keystrokegram. Keystrokegrams are used by clients to control a server remotely. The server may accept and process keystrokegrams, or summarily ignore them, depending on the server's session state and the ID of the sender (client).

Keystrokegrams contain either shift state changes or keystrokes (two-byte combinations) in the form that would be returned to a program executing an INT 16 (BIOS call) on a PC/AT compatible computer. The codes and formats are defined in the IBM PC or AT Technical Reference. The keystrokes and shift state changes are enqueued by the server for passage to the applications program on a first-in first-out (FIFO) basis. If the queue is full (i.e., the input rate from the client or clients has exceeded the applications keyboard processing rate), no keystrokegrams will be processed. The server's INT 16 processing is described in a later section.

The NETI_S program in the server also times sessions, if timing is selected in the configuration file. Timing sessions is a means to prevent a failed or covetous client from holding a session indefinitely. If a session is timed out, the server will allocate and format a closure packet which will contain a reply message with a flag advising the client that it may no longer send keystrokegrams to the server.

At intervals specified in the initialization parameters, NETI_S will allocate a packet and format a "heartbeat" message, detailing the server's identifier, its object descriptor (the identifier of the screen image) and the current sequence number of the videograms, and will then enqueue this packet for transmission.

When NETI_S is finished, it restores all registers and machine states and transfers control to the original INT 08 vector address that was extant when the server was first initialized, so that the application program may continue from where it was interrupted.

NETI_S intercepts INT 16 (BIOS Keyboard Read) calls from the application program and directly processes them, as follows:

INT 16 function AH=0 is a request by the application for the next stored keystroke, if any. If no character is in the keyboard character queue, the application program expects the system BIOS to keep control, looping indefinitely until a keystroke is received and processed by the system's BIOS INT 09 handler, and queued for the INT 16 handler.

INT 16 function AH=1 is a poll by the application to the system BIOS to determine whether there are any queued keystrokes.

INT 16 function AH=2 is a query by the application for the current keyboard shift states maintained by the system BIOS.

For AH=0, NETI_S acts as follows:

NETI_S checks the network queue for keystrokes. If the queue is not empty, NETI_S tests whether the top entry in the queue represents a keystroke or a shift status change. If the entry is a shift status change, the server pops it from the queue and saves the shift status information. If the PROCESS_SHIFT_STATE=BIOS option was selected at initialization, NETI_S will store the shift status information in the memory areas reserved for this information by the system BIOS. If the PROCESS_SHIFT_STATE=LOCAL option was selected, NETI_S will store the information in local cells. After processing the shift status change, NETI_S will loop to the test for a non-empty queue and the process will repeat.

If the top entry in the queue is a keystroke, the information is passed back to the application as the response to the INT 16 AH=0 call.

If the queue is empty, NETI_S must check to see if the BIOS queue is empty. This permits the application to process keystrokes received from either the network, the real keyboard or both (with the network taking priority). This is part of the transparency of NETI_S.

NETI_S checks the BIOS queue by performing a call to the original INT 16 vector address with AH=1. BIOS will report back whether or not there are any "true" keystrokes queued. If the return indicates that the BIOS queue is not empty, NETI_S will execute a call to the original INT 16 vector address with AH=0. NETI_S will pass the information from BIOS to the application program when the BIOS returns it to the server.

If the return from the AH=1 call to BIOS indicates that the BIOS queue is empty, NETI_S will loop back to the logic point where it first checks the network keystroke queue.

For AH=1, the NETI_S program acts as follows:

NETI_S checks the network queue for keystrokes. If the queue is not empty, NETI_S will set the Z flag in the saved flags on the stack to indicate that data is waiting and then return control to the application program. If the network queue is empty, NETI_S will call BIOS 16 with AH=1 and pass the information returned by BIOS to the application program.

For AH=2, If the PROCESS_SHIFT_STATE=BIOS option was selected at initialization, NETI_S will call BIOS INT 16 with AH=2 and pass the information returned by BIOS to the application program. If the PROCESS_SHIFT_STATUS=LOCAL option was selected, NETI_S will return the information stored locally.

For any Other value in AH, NETI_S will call BIOS INT 16 with the same value in AH, and pass any values back to the application program when BIOS returns.

The function of NETI_C is as follows.

The NETI_C initialization program reads a parameter file which describes the set of user-dependent options and the operating characteristics which will be invoked for the instant execution of the system. The parameter file contains a list of servers that may be accessed by the client, their network addresses, the hot-key sequences needed to switch screen and keyboard control to them, the screen assignments and types of access. The client can also be directed to dedicate sections of video memory on an exclusive or shared basis. This permits the client to maintain the screen images for servers even while they are not on display.

The client may also have a "learn" mode so that changes to the client's server/hot-key list can be made dynamically, without need to reload the system.

A typical initialization configuration file for a client contains the CLIENT_IDENTIFIER that will be used by the client, and a series of definitions for each server the client is permitted to access. For each server, the file specifies a server identifier, the hot key sequence used to reach that server, the name of a server attribute conversion file, if any, to assist in converting server attributes for that server, a server character conversion file, if any, to assist in converting characters for that server, information on the proper display characteristics for that server, and information on whether the access will be control (keyboard access) or video access (view-only).

NETI_S also performs a diagnostic/system assurance test to determine that the specified names/numbers are operational on the LAN, and establishes registers to intercept and process the hardware interrupts 08 (system clock) and 09 (keyboard service).

NETI_S will optionally rotate the interrupt priorities so the that clock is lowest.

The program NETI_C, running in the client computer, performs the following functions:

At each clock tick (interrupt 08) or other interval as may be specified in the initialization parameters, NETI_C will:

Check the network received packet queue for messages. If the queue is not empty, NETI_C will pop the top entry from the queue and process it according to message type. Permissible message types are videograms, heartbeats, and closures.

If a videogram is received, NETI_C will verify whether the server identifier in the message header is one of the servers that the client is currently watching. If NETI_C is not watching the transmitting server, the message will be ignored.

NETI_C will compare the sequence number contained in the packet header. If the sequence number is not one more (modulo 256) than the last MSG_ID received from the server and processed by the client, and no client has an outstanding (unanswered) video refresh request to the same server/object, then NETI_C will allocate a packet and format an external request message for a recovery transmission of the screen from the server.

If the MSG_ID is one greater (modulo 256) than the last MSG_ID received from the server, NETI_C will process it.

NETI_C processes videograms according to the video commands contained within the packets. Videograms may contain multiple commands, packed consecutively, up to the length of the data field of the packet. NETI_C successively processes these commands until the packet is exhausted. Possible video commands include set-mode, set-cursor, data, and data-compressed.

Set-mode commands describe the video environment of the server, i.e., whether the server is operating in text or graphics modes, the color selections and resolutions, and the size of the refresh buffer. NETI_C will accommodate the video environment of the server. Changes to the video mode may force NETI_C to clear the refresh buffer.

Set-cursor commands convey the current cursor position of the server. NETI_C will record the cursor position for the particular server. If that server's screen is currently on display, NETI_C will position the cursor for that display accordingly.

If a data packet is received, NETI_C will interpret data in the packet as data attribute pairs and optionally perform a two-level translation on the attributes and data in the packet. The first is a direct translation of the attribute bytes on a one-for-one basis, using a 256-byte table read in at initialization. The second, is a one-for-two byte look up, exchanging each data byte for a translated data byte and a second attribute byte which is logically "ORed" with the first translated attribute byte. In this manner, NETI_C can switch to an alternate character set, if needed, by setting an attribute bit.

Following the translations, if any, NETI_C will act to place the received data and attributes into video memory of the client. The method used will depend on the initialization parameters for the service (BIOS calls or direct memory access).

If a data-compressed packet is received, the commands are processed exactly like the data commands, except that NETI_C expands the data byte/attribute pair by the count specified in the command.

If a heartbeat packet is received, NETI_C will compare the server identifier contained in the heartbeat message and determine if there is a corresponding entry in the list of servers currently on watch. If an entry is found, the list of object descriptors contained in the message is processed, one-by-one, and matched with entries in NETI_C's list of servers. NETI_C may be watching more than one object from a cooperating server, hence there is the need to scan the list of servers from the beginning for each entry in the heartbeat message. The term "object" as use herein refers to any entity which can be uniquely identified (i.e., named) on a LAN, such as a data record or a screen.

If a match is found, NETI_C will compare the sequence number contained in the heartbeat message with the current sequence number in the corresponding entry in NETI_C's list of servers. If the comparison fails, NETI_C will log the error and allocate a packet and format a DP_RQST message (recovery transmission) for the server/object and queue it for transmission.

Closure packets contain reply messages which are the servers responses to requests made by clients or to changing conditions. Processing of these messages depend on NETI_C's state:

If the message is a reply to a video refresh request and NETI_C has requested a video refresh, NETI_C will use the sequence number in the reply message to synchronize with the server.

If the message is a reply to a video refresh request and NETI_C has not requested a video refresh, NETI_C will assume a security violation, and display an appropriate error message. If NETI_C is currently watching the transmitting server, NETI_C will cease watching that server and clear the assigned video memory.

If the message is a reply to a keyboard access request, NETI_C will enable or disable "hot key" access to the server, whether or not NETI_C has an outstanding request for keyboard access for that server. The reason for this is that the server may need to preempt the requesting client's access to the keyboard and may generate this message at any time.

NETI_C may be programmed to time out outstanding requests for service. NETI_C will wait a reasonable interval, about five seconds, for a server to reply to a request for video refresh or keyboard access before discontinuing the wait and displaying an error advisory message.

Upon the occurrence of every keyboard interrupt (09), NETI_C will examine the event and respond according to the type of interrupt and the current state.

NETI_C will determine if the instant interrupt and current state requires a "hot key" switch to a remote server or back to the application program. As mentioned above, at initialization, NETI_C was provided with a list of remote servers and the "hot keys" needed to effect a switch. NETI_C will inspect the current shift states and the instant keyboard scan code and attempt to find a match in the server list. If no match is found, NETI_C will act in the following manner depending on the current keyboard state:

If the client keyboard is currently "attached" to the transparent application program running in the client computer, NETI_C will pass the interrupt on to the system BIOS of the client computer.

If the client keyboard is currently attached to a remote server, NETI_C will process the interrupt. There are two client keyboard processing options which are separately selectable for each server:

UNBUFFERED processing means that NETI_C will transmit every keystroke and shift state change to the attached server, when the events occur. NETI_C will examine the instant keyboard scan code and then pass the event to the system BIOS. NETI_C will then call the system BIOS with an INT 16 function 2 to get the current shift status. If the shift status is different than the shift status that existed prior to the event, NETI_C will allocate a packet and format a keystrokegram message with a set-state order, and queue it for transmission to inform the server.

If the instant code is a "make," (downstroke of a key), NETI_C will then invoke the system BIOS with an INT 16 function 1, to determine if a character is queued. If a character is on the queue, NETI_C will invoke the system BIOS with an INT 16 function 0, to retrieve the decoded character. NETI_C will allocate a packet and format a keystrokegram message with a send-stroke order, and queue it for transmission to the server.

BUFFERED processing means that NETI_C will not transmit every keystroke and shift state change when it occurs, but will instead buffer keystrokes and shift state changes in packets formatted for a keystrokegram until NETI_C specifically releases them for transmission to the server. NETI_C will intersperse set-state orders and send-multiple orders in the packets.

If a hot key sequence has been entered, and NETI_C finds a match in the server list, NETI_C will attempt to make the switch. The switch affects both the keyboard and screen(s). If the client keyboard is currently attached to a remote server, NETI_C will allocate a packet and format a keyboard access request or release request and queue it for transmission. If the new entry in the server list indicates keyboard access, i.e. control and not access, NETI_C will allocate a packet and format a keyboard access or control request (attach request), and queue it for transmission. NETI_C may not submit keystrokegrams to the server until keyboard access is granted. NETI_C will set a protective timer (about five seconds) for the server's reply.

If the match in the server list is the transparent application running within the client computer, NETI_C will switch the keyboard attachment to the transparent application.

NETI_C than takes steps to set up the display. NETI_C will reference the server's description in the table, and act accordingly.

If the referenced server is currently on display on the client monitor, no action is taken.

If the referenced server is not on display, NETI_C will transfer control of the designated display to the referenced server. If the display had been in use by the application program, NETI_C will save the current video packet and format a request packet for a video refresh (initial) and queue it for transmission. NETI_C will set a protective timer (about five seconds) for the server's reply.

If the entry in the server list is the transparent application, and it is not on display, NETI_C will transfer control of the designated display and restore the application's video environment.

COOPERATING SERVICES

A "cooperating" server is a computer on a NETI network that is specially programmed to simultaneously be some arbitrary number of transparent servers to clients. The term "cooperating" is used to indicate that the applications software running on the cooperating server acts in concert, or cooperates, with the server functions on the network. The application makes use of procedure libraries provided by the cooperating server software to "publish" pages of information on the network. These pages are formatted to appear to clients as server video screens, and clients interact with cooperating servers in exactly the same manner as they do with Transparent servers.

The cooperating server procedure libraries pass received packets containing keystrokegrams and service requests transmitted by clients to the cooperating application. The cooperating application must handle the request and reply functions described in the sections on server functions. The application "writes" to the pages through procedure calls, and the libraries directly generate the videogram packets and transmit them.

COOPERATING CLIENTS

A "cooperating" client is a computer on a network of the invention that is specially programmed to act as a client computer on a network. The term "cooperating" is used to indicate that the client software running on the cooperating client acts in concert, or cooperates, with the system or applications supervisor program. The client software program performs all of the functions of a transparent client, but cooperates with the system supervisor to gain control of the keyboard and screen displays. Cooperating client software can be developed for any computer that can physically and logically interface with a compatible local area network. Examples of computer systems hardware and system supervisors which may be modified to serve as cooperating client software include: Microsoft Windows, Microsoft Windows/386, Microsoft - IBM OS/2, and Microsoft Xenix, all of which are PC-based supervisors; and Apollo, Digital Equipment Corporation, Sun, Unisys, and Data General, all of which are non-PC-based systems.

From the network, cooperating clients are indistinguishable from transparent clients since each must obey the same rules.

In the exemplary embodiment, NETI_S and NETI_C are identical. In Appendix I, the routines NETIRES, NETI, NET_VID, NET_KEY and NETI_END together form NETI_S or NETI_C. NETIRES is written in PASCAL. The other routines of NETI_C or NETI_S are written in assembly language. Furthermore, in Appendix I, the routines NET_INS, FIPSRES, FPS_DGI and NET_ESC together form FIPSRES. FIPSRES and FPS_DGI are written in PASCAL. The other routines are written in assembly language.

In addition, in Appendix I, the routines CRTCTL, VDOUT, and VD_SUBS are used to adapt an application program for use in a cooperating server.

It is understood that while the present invention has been described with reference to a specific exemplary embodiment thereof, various modifications and alterations may be made to the exemplary embodiment by those of ordinary skill in the art without departing from the spirit or scope of the invention as defined in the appended claims. For example, a transparent client on the LAN may simultaneously operate as a transparent server by permitting shared remote access or control of its application program by one or more other clients on the LAN. Similarly, a transparent server on the LAN may simultaneously operate as a transparent client for accessing or controlling an application program in another server on the LAN. Further, a cooperating client or a cooperating server on the LAN may each be programmed to simultaneously emulate a plurality of transparent clients and a plurality of transparent servers.

I claim:

1. A system for remote shared access or control or one or more application programs executing in one or more server computers on a local-area network by one or more client computers on the local-area network, each of the server computers having at least a first memory containing video data representing a screen presentation, a second memory having at least one application program, a selective operating system program and a respective local-area network driver program, a processor for executing the programs in the second memory, and a respective interface to the local-area network, and each of the client computers having at least a first memory containing video data representing a screen presentation, a display for presenting the video data in its first memory, a second memory containing a respective operating system program and a respective network driver program, a processor for executing the programs in the second memory, a keyboard, and a respective interface to the local-area network, the system comprising:

means operatively coupled to the first memory in each server computer and being responsive to a change in the video data in the first memory of the server computer for providing on the local-area network one or more videograms representing the change in such video data;

means in each client computer responsive to one of a plurality of first predetermined sequences of keystrokes entered from the keyboard of the client computer for providing on the local-area network a control request message requesting control of an application program of a particular one of the server computers;

means in each server computer responsive to a control request message on the local-area network requesting control of an application program of the server computer for confirming whether or not the client computer providing the control request message is permitted to control such application program and providing on the local-area network a control request reply message respectively granting or denying the client computer providing the control request message control of such application program of the server computer;

means in each client computer responsive to a control request reply message on the local-area network granting the client computer control of an application program of a particular one of the server computers, to which the client computer has provided a control request message, for providing a video recovery request message on the local-area network requesting one or more videograms representing all the video data in the first memory of the particular one of the server computers, and thereafter receiving and processing each videogram on the local-area network providing by the particular one of the server computers by changing the video data in the first memory of the client computer in accordance with the videogram;

means in each client computer responsive to a control request reply message on the local-area network granting the client computer control of an application program of a particular one of the server computers, to which the client computer has provided a control request message, for subsequently responding to one or more keystrokes from the keyboard of the client computer and providing on the local-area network one or more keystrokegrams representing the one or more keystrokes;

means in each server computer responsive to a video recovery request message on the local-area network from a client computer, to which the server computer has granted control of an application program thereof, for providing on the local-area network one or more videograms representing all the video data in the first memory of the server computer; and means in each server computer responsive to one or more keystrokegrams on the local-area network from a client computer, to which the server computer has granted control of an application program thereof, for deriving one or more keystrokes represented by such keystrokegrams and passing the derived keystrokes for processing by such application program of the server computer.

2. A system for remote shared access or control according to claim 1, further comprising:

means in each client computer responsive to one of a plurality of second predetermined sequences of keystrokes from the keyboard of the client computer for providing on the local area network a video request message requesting access to the video data in the first memory of a particular one of the server computers;

means in each server computer responsive to a video request message on the local area network requesting access to the video data in the first memory of the server computer for confirming whether or not the client computer providing the video request message is permitted to access the video data in the first memory of the server computer and providing on the local area network a video request reply message respectively granting or denying the client computer providing the video request message access to the video data in the first memory of the server computer, wherein if the client computer providing the video request message is granted such access, the server computer provides on the local area network one or more videograms representing all the video data in the first memory of the server computer; and means in each client computer responsive to a video request reply message granting the client access to the video data in the first memory of a particular one of the server computers, to which the client computer has provided a video request message, for receiving and processing each videogram on the local area network provided by the particular one of the server computer by changing the video data in the first memory of the client computer in accordance with the videogram.

3. A system for remote shared access or control according to claim 2, further comprising means in each server computer for passing keystrokes derived from keystrokegrams provided by each client computer, to which the server computer has granted control of an application program thereof, in accordance with a predetermined priority scheme, wherein if the server computer has its own keyboard, keystrokes entered from such keyboard are assigned a lower priority than keystrokes derived by the server computer from keystrokegrams on the local area network.

4. A system for remote shared access or control according to claim 3, wherein each videogram provided by a server computer includes a sequence number indicative of the order in which the videogram is provided on the local area network by the server computer, and each control request reply and video request reply provided by the server computer granting a client computer control of the application program in the server computer and access to the video data in the first memory of the server computer, respectively, includes the sequence number of a next videogram to be provided on the local area network by the server computer, further comprising in each client computer means for determining whether the sequence number of a current videogram on the local area network provided by a server computer, which has granted the client computer control of an application program thereof or which has granted the client access to the video data in the first memory thereof, is greater by one than the sequence number of a previous videogram provided by such server computer and processed by the client computer, and for providing a video refresh request on the local-area network to such server computer if the sequence number of the current videogram is not greater by one than the sequence number of the previous videogram.

5. A system for remote shared access or control according to claim 4, wherein each of the means in each server computer comprises one or more program routines in the second memory of each server computer executed by the processor of each server computer, and each of the means in each client computer comprises one or more program routines in the second memory of each client computer executed by the processor of each client computer.

6. A system for remote shared access or control according to claim 5, wherein each of the program routines of the means in each server computer are terminate-and-stay-resident program routines separate from each application program of each server computer, and the program routines of the means in each client computer are terminate-and-stay-resident program routines separate from any application program of each client computer.

7. A system for remote shared access or control according to claim 5, wherein the program routines of the means in each server computer are part of at least one application program of at least one server computer.

8. A system for remote shared access or control according to claim 7, further comprising one or more cooperating server computers coupled to the local-area network, each of the cooperating server computers having a plurality of first memories each containing respective video data representing a corresponding screen presentation, a second memory having a plurality of application programs each including the program routines of the means in each server computer, a respective operating system program and a respective local-area network driver program, a processor for executing the programs in the second memory, and a respective interface to the local-area network, each cooperating server computer being programmed to concurrently execute the plurality of application programs, whereby each cooperating server computer is capable of functioning as a plurality of server computers on the local-area network.

9. A system for remote shared access or control according to claim 5, wherein the program routines of the means in each client computer are part of at least one application program of at least one client computer.

10. A system for remote shared access or control according to claim 9, further comprising one or more cooperating client computers coupled to the local area network, each of the cooperating client computers having a plurality of first memories each containing respective video data representing a corresponding screen presentation, a second memory having a plurality of application programs each including the program routines of the means in each client computer, a respective operating system program and a respective local-area network driver program, a processor for executing the programs in the second memory and a respective interface to the local-area network, each cooperating client computer being programmed to concurrently execute the plurality of respective application programs, whereby each cooperating client is capable of functioning as a plurality of client computers on the local-area network.

11. A system for remote shared access of one or more application programs executing in one or more server computers on a local area network by one or more client computers on the local area network, each of the server computers having at least a first memory containing video data representing a screen presentation, a second memory having at least one application program, a respective operating system program and a respective local area network driver program, a processor for executing the programs in the program memory, and a respective interface to the local area network, each of the client computers having at least a first memory containing video data representing a screen presentation, a display for presenting the video data in the first memory, a keyboard, a second memory having a respective operating system program and a respective network driver program, a processor for executing the programs in the program memory, and a respective interface to the local area network, the system comprising:

means in each server computer responsive to a change in the video data in the first memory of the server computer for providing on the local area network one or more videograms representing the change in such video data;

means in each client computer responsive to one of a plurality of first predetermined sequences of keystrokes entered from the keyboard of the client computer for providing on the local area network a video request message requesting access to the video data in the first memory of a particular one of the server computers;

means in each server computer responsive to a video request message on the local area network requesting access to the video data in the first memory of the server computer for confirming whether or not the client computer providing the video request message is permitted to access the video data in the first memory of the server computer and providing on the local area network a video request reply message respectively granting or denying the client computer providing the video request message access to the video data in the first memory of the server computer wherein if the client computer providing the video request message is granted such access, the server computer provides on the local area network one or more videograms representing all video data in the first memory of the server computer; and means in each client computer responsive to a video request reply message granting the client access to the video data in the first memory of a particular one of the server computers, for which, the client has provided a video request message, for receiving and processing each videogram on the local area network provided by the particular one of the server computers by changing the video data in the first memory of the client computer in accordance with the videogram.

12. A system for remote shared access according to claim 11, wherein each videogram provided by a server computer includes a sequence number indicative of the order in which the videogram is provided on the local area network by the server computer, and each video request reply provided by the server computer granting a client computer access to the video data in the first memory of the server computer includes the sequence number of the next videogram to be provided on the local area network by the server computer, further comprising in each client computer means for determining whether the sequence number of a current videogram on the local area network provided by a server computer which has granted the client computer access to the video data in the first memory means thereof is greater by one than the sequence number of the previous videogram provided by such server computer and processed by the client computer, and for providing a video refresh request to such server computer if the sequence number of the current videogram is not greater by one than the sequence number of the previous videogram.

13. A system for remote shared access according to claim 11, wherein the second memory of at least one of the server computer has a program for providing communications with an information service providing data for processing by one or more of the application programs of the server computers, and wherein the at least one of the server computers additionally comprises a modem for operatively connecting the at least one of the server computers with a communications line to the information service.

14. A system for use in a securities firm trading floor for remote shared access of one or more application programs executing in one or more server computers on a local-area network by one or more client computers on the local-area network, each of the server computers having at least a first memory containing video data representing a screen presentation, a second memory having at least one application program, a respective operating system program and a respective local-area network driver program, a processor for executing the programs in the second memory, and a respective interface to the local-area network, wherein at least one of the server computers further comprises a modem, the second memory of the at least one of the server computers has a program for providing communications with an information service providing data for processing by one or more of the application programs of the server computers, and the modem is operatively connected to communicate with the information service, each of the client computers having at least a first memory containing video data representing a screen presentation, a display for preventing the video data in the first memory, a keyboard, a second memory having a respective network driver program, a processor for executing the programs in the second memory, and a respective interface to the local-area network, the system further comprising:

means in each server computer responsive to a change in the video data in the first memory of the server computer for providing on the local-area network one or more videograms representing the change in such video data;

means in each client computer responsive to one of a plurality of first predetermined sequences of keystrokes entered from the keyboard of the client computer for providing on the local-area network a video request message requesting access to the video data in the first memory of a particular one of the server computers;

means in each server computer responsive to a video request message on the local-area network requesting access to the video data in the first memory of the server computer for confirming whether or not the client computer providing the video request message is permitted to access the video data in the first memory of the server computer and providing on the local-area network a video request reply message respectively granting or denying the client computer providing the video request message access to the video data in the first memory of the server computer, wherein if the client computer providing the video request message is granted such access, the server computer provides on the local-area network one or more videograms representing all video data in the first memory of the server computer; and means in each client computer responsive to a video request reply message granting the client access to the video data in the first memory of a particular one of the server computers, for which the client has provided a video request message, for receiving and processing each videogram on the local-area network provided by the particular one of the server computers by changing the video data in the first memory of the client computer in accordance with the videogram.

15. A system for remote shared access according to claim 11, wherein each videogram provided by a server computer includes a sequence number indicative of the order in which the videogram is provided on the local area network by the server computer, and each video request reply provided by the server computer granting a client computer access to the video data in the first memory of the server computer includes the sequence number of the next videogram to be provided on the local area network by the server computer, further comprising in each client computer means for determining whether the sequence number of a current videogram on the local area network provided by a server computer which has granted the client computer access to the video data in the first memory means thereof is greater by one than the sequence number of the previous videogram provided by such server computer and processed by the client computer, and for providing a video refresh request to such server computer if the sequence number of the current videogram is not greater by one than the sequence number of the previous videogram.

* * * * *

UNITED STATES PATENT AND TRADEMARK OFFICE
CERTIFICATE OF CORRECTION

PATENT NO. : 4,949,248

DATED : Aug. 14, 1990

INVENTOR(S) : Marshall A. Caro

It is certified that error appears in the above-identified patent and that said Letters Patent is hereby corrected as shown below:

Col. 3, line 27, "quadrupled" should read -- quadruples --.
Col. 7, line 6, "of plurality" should read -- a plurality --.
Col. 8, line 13, "client clients" should read -- clients --.
Col. 11, line 4, "is provided" should read -- provides --.
Col. 13, line 37, "VCLASTORDER" should read -- VC_LAST_ORDER --; line 38, "VCSETMODE" should read -- VC_SET_MODE --; line 39, "VCSETCURSOR" should read -- VC_SET_CURSOR --; line 40, "VCSENDDATA" should read -- VC_SEND_DATA --; line 42, "VCSENDCOMPRESSED" should read -- VC_SEND_COMPRESSED --; line 56, "KLASTORDER" should read -- K_LAST_ORDER --; line 57, "KSETSTATE" should read -- K_SET_STATE --; line 58, "KSENDSTROKE" should read -- K_SEND_STROKE --; line 59, "KSENDMULTIPLE" should read -- K_SEND_MULTIPLE --. Col. 18, line 10, "Other" should read -- other --. Col. 19, line 57, "use" should read -- used --; line 68, "servers" should read -- servers'--. Col. 20, lines 1-2, "depend" should read -- depends --. Col. 21, line 23, "than" should read -- then --; line 32, after "video" insert -- environment. NETI_C will clear the screen and allocate a --; line 40, "SERVICES" should read -- SERVERS --. Col. 22, line 59, "selective" should read -- respective --. .Col. 24, line 34, "computer" should read -- computers --. Col. 26, line 51, delete the comma after "which".

UNITED STATES PATENT AND TRADEMARK OFFICE
CERTIFICATE OF CORRECTION

PATENT NO. : 4,949,248

DATED : August 14, 1990

INVENTOR(S) : Marshall A. Caro

It is certified that error appears in the above-identified patent and that said Letters Patent is hereby corrected as shown below:

Col. 27, line 14, "computer" should read --computers--;

line 43, "preventing" should read --presenting--.

Signed and Sealed this

Seventeenth Day of December, 1991

*Attest:*

HARRY F. MANBECK, JR.

*Attesting Officer*          *Commissioner of Patents and Trademarks*